US010223110B2

(12) United States Patent
Saeki

(10) Patent No.: US 10,223,110 B2
(45) Date of Patent: Mar. 5, 2019

(54) CENTRAL PROCESSING UNIT AND ARITHMETIC UNIT

(71) Applicant: Renesas Electronics Corporation, Kawasaki-shi, Kanagawa (JP)

(72) Inventor: Minoru Saeki, Tokyo (JP)

(73) Assignee: Renesas Electronics Corporation, Tokyo (JP)

(*) Notice: Subject to any disclaimer, the term of this patent is extended or adjusted under 35 U.S.C. 154(b) by 515 days.

(21) Appl. No.: 14/013,144

(22) Filed: Aug. 29, 2013

(65) Prior Publication Data

US 2014/0068231 A1 Mar. 6, 2014

(30) Foreign Application Priority Data

Aug. 30, 2012 (JP) ................. 2012-190295

(51) Int. Cl.
*G06F 9/302* (2018.01)
*G06F 21/75* (2013.01)
(Continued)

(52) U.S. Cl.
CPC ........ *G06F 9/3001* (2013.01); *G06F 9/30181* (2013.01); *G06F 9/3869* (2013.01);
(Continued)

(58) Field of Classification Search
CPC ............. G06G 9/3001; G06F 9/30036; G06F 12/1408; G06F 9/3001; G06F 21/556; G06F 21/558; G06F 9/30181; G06F 9/3069; G06F 9/3869; G06F 21/75; G06F 21/755; G06F 2221/2123; G06F 2221/2125; H04L 9/003
(Continued)

(56) References Cited

U.S. PATENT DOCUMENTS 5,495,616 A * 2/1996 Henry ............... G06F 13/24
710/260
7,016,929 B2 * 3/2006 Fischer ............... G06F 7/723
708/491
(Continued)

FOREIGN PATENT DOCUMENTS

JP 2011-234312 A 11/2011

OTHER PUBLICATIONS

Basic Circuit Design and Multiplexers, howardhuang.us/teaching/cs231/04-Basic-circuit-design-and-multiplexers.pdf, Jun. 23, 2003 (Year: 2003).*
(Continued)

*Primary Examiner* — Daniel H Pan
(74) *Attorney, Agent, or Firm* — McDermott Will & Emery LLP

(57) ABSTRACT

There is a need to provide a central processing unit capable of improving the resistance to power analysis attack without changing programs, lowering clock frequencies, and greatly redesigning a central processing unit of the related art. In a central processing unit, an arithmetic unit is capable of performing arithmetic operation using data irrelevant to data stored in a register group. A control unit allows the arithmetic unit to perform arithmetic processing corresponding to an incorporated instruction. At this time, the control unit allows the arithmetic unit to perform arithmetic processing using the irrelevant data during a first one-clock cycle.

11 Claims, 19 Drawing Sheets

(51) Int. Cl.
　　　G06F 9/30　　　(2018.01)
　　　G06F 9/38　　　(2018.01)
　　　H04L 9/00　　　(2006.01)
　　　G06F 21/55　　(2013.01)
(52) U.S. Cl.
　　　CPC ......... *G06F 21/755* (2017.08); *G06F 21/556* (2013.01); *G06F 21/75* (2013.01); *G06F 2221/2123* (2013.01); *G06F 2221/2125* (2013.01); *H04L 9/003* (2013.01)
(58) Field of Classification Search
　　　USPC ............ 712/221, 227; 713/190; 380/28, 29; 726/26, 34, 36
　　　See application file for complete search history.

(56) References Cited

U.S. PATENT DOCUMENTS

| | | | | |
|---|---|---|---|---|
| 7,162,456 | B2* | 1/2007 | de Jong | G06F 21/31 705/317 |
| 7,549,059 | B2* | 6/2009 | Watt | H04L 12/417 713/193 |
| 7,864,951 | B2* | 1/2011 | Al-Gahtani | H04L 9/003 380/255 |
| 7,949,883 | B2* | 5/2011 | Shu | G06F 9/3001 713/190 |
| 2002/0084333 | A1* | 7/2002 | Nakano | G06F 13/4239 235/492 |
| 2002/0131596 | A1* | 9/2002 | Boeckeler | G06F 21/558 380/252 |
| 2004/0091107 | A1* | 5/2004 | Fujisaki | H04L 9/003 380/42 |
| 2005/0271202 | A1* | 12/2005 | Shu | G06F 9/3001 380/29 |
| 2008/0130877 | A1* | 6/2008 | Joye | G06F 7/723 380/30 |
| 2010/0005131 | A1* | 1/2010 | Fukazawa | H04L 9/003 708/491 |
| 2010/0095133 | A1* | 4/2010 | Peter | G06F 7/00 713/189 |
| 2011/0176674 | A1* | 7/2011 | Romain | H04L 9/002 380/29 |

OTHER PUBLICATIONS

Japanese Office Action issued in Japanese Application No. 2012-190295, dated Oct. 6, 2015, with English translation.
Paul Kocher, et al., "Differential Power Analysis", CRYPTO 1999. LNCS, vol. 1666, pp. 388-397,1999. Springer, Heidelberg (1999).
Eric Brier, et al.,"Correlation Power Anaylsis with a Leakage Model", CHES 2004, LNCS 3156, pp. 16-29, Springer, Heidelberg (2004).
Daisuke Suzuki, et al., "DPA Leakage Models for CMOS Logic Circuits", CHES 2005, LNCS 3659, pp. 366-382, (2005).

* cited by examiner

CENTRAL PROCESSING UNIT AND ARITHMETIC UNIT

CROSS-REFERENCE TO RELATED APPLICATIONS

The disclosure of Japanese Patent Application No. 2012-190295 filed on Aug. 30, 2012 including the specification, drawings and abstract is incorporated herein by reference in its entirety.

BACKGROUND

The present invention relates to a central processing unit and an arithmetic unit and is favorably used for protection against a power analysis attack, for example.

The power analysis attack analyzes a slight bias of the power consumption dependent on data processed in a central processing unit (CPU) to acquire confidential information processed in the CPU (e.g., see non-patent documents 1 through 3).

Japanese Unexamined Patent Publication No. 2011-234312 (patent document 1) discloses a well-known technology capable of improving the resistance to power analysis attack. The technology can improve the resistance to power analysis attack without greatly redesigning a CPU (especially an arithmetic unit) of the related art. The inventors of this application invented this technology.

Specifically, the arithmetic unit described in the document is provided with a selection circuit uniquely corresponding to at least part of circuit elements such as logical gates and flip-flops configuring the arithmetic unit. Each selection circuit receives an output signal from the corresponding circuit element and a signal irrelevant to arithmetic operations and selectively outputs one of the signals. This can change internal signals of the arithmetic unit and output signals from the same to states irrelevant to arithmetic operations.

Patent Document 1: Japanese Unexamined Patent Publication No. 2011-234312

Non-Patent Document 1: Kocher, et al., "Differential Power Analysis." CRYPTO 1999. LNCS, vol. 1666, Springer, Heidelberg (1999). pp. 388-397.

Non-Patent Document 2: Brier, et al., "Correlation Power Analysis with a Leakage Model." CHES 2004.LNCS, vol. 3156, Springer, Heidelberg (2004), pp. 16-29.

Non-Patent Document 3: Suzuki, et al., "DPA Leakage Models for CMOS Logic Circuits." CHES 2005. LNCS, vol. 3659, Springer-Verlag (2005), pp. 366-382.

SUMMARY

Japanese Unexamined Patent Publication No. 2011-234312 (patent document 1) proposes the method of providing a dedicated instruction (change instruction) as a method of determining the timing to change internal signals of the arithmetic unit and output signals from the same to states irrelevant to arithmetic operations. According to this method, however, a programmer is responsible for determining which instruction is preceded or followed by the change instruction to effectively prevent power analysis attack. This increases loads on program development. Furthermore, inserting the change instruction increases the program size.

Another method proposed in the document changes internal signals of the arithmetic unit and output signals from the same to states irrelevant to arithmetic operations at the timing corresponding to the rising edge of a clock signal. The method returns internal signals of the arithmetic unit and output signals from the same to the original states at the timing corresponding to the falling edge of the clock signal. However, this method must complete an arithmetic operation until the clock signal rises next after the clock signal falls. The central processing unit must use clock frequencies lower than usual.

The present invention has been made in consideration of the foregoing as an improvement of the invention disclosed in Japanese Unexamined Patent Publication No. 2011-234312 (patent document 1). It is, therefore, an object of the invention to provide a central processing unit and an arithmetic unit capable of improving the resistance to power analysis attack without changing programs, lowering clock frequencies, and greatly redesigning the arithmetic unit and the central processing unit of the related art. These and other objects and novel features of the invention may be readily ascertained by referring to the following description and appended drawings.

A central processing unit according to an embodiment includes an arithmetic unit that can perform arithmetic operations using data irrelevant to data stored in a register group. A control unit allows the arithmetic unit to perform arithmetic processing corresponding to an incorporated instruction so that the arithmetic processing uses the irrelevant data at the first one-clock cycle.

The embodiment can improve the resistance to power analysis attack without changing programs, lowering clock frequencies, and greatly redesigning the arithmetic unit and the central processing unit of the related art.

DETAILED DESCRIPTION

Figure 1:
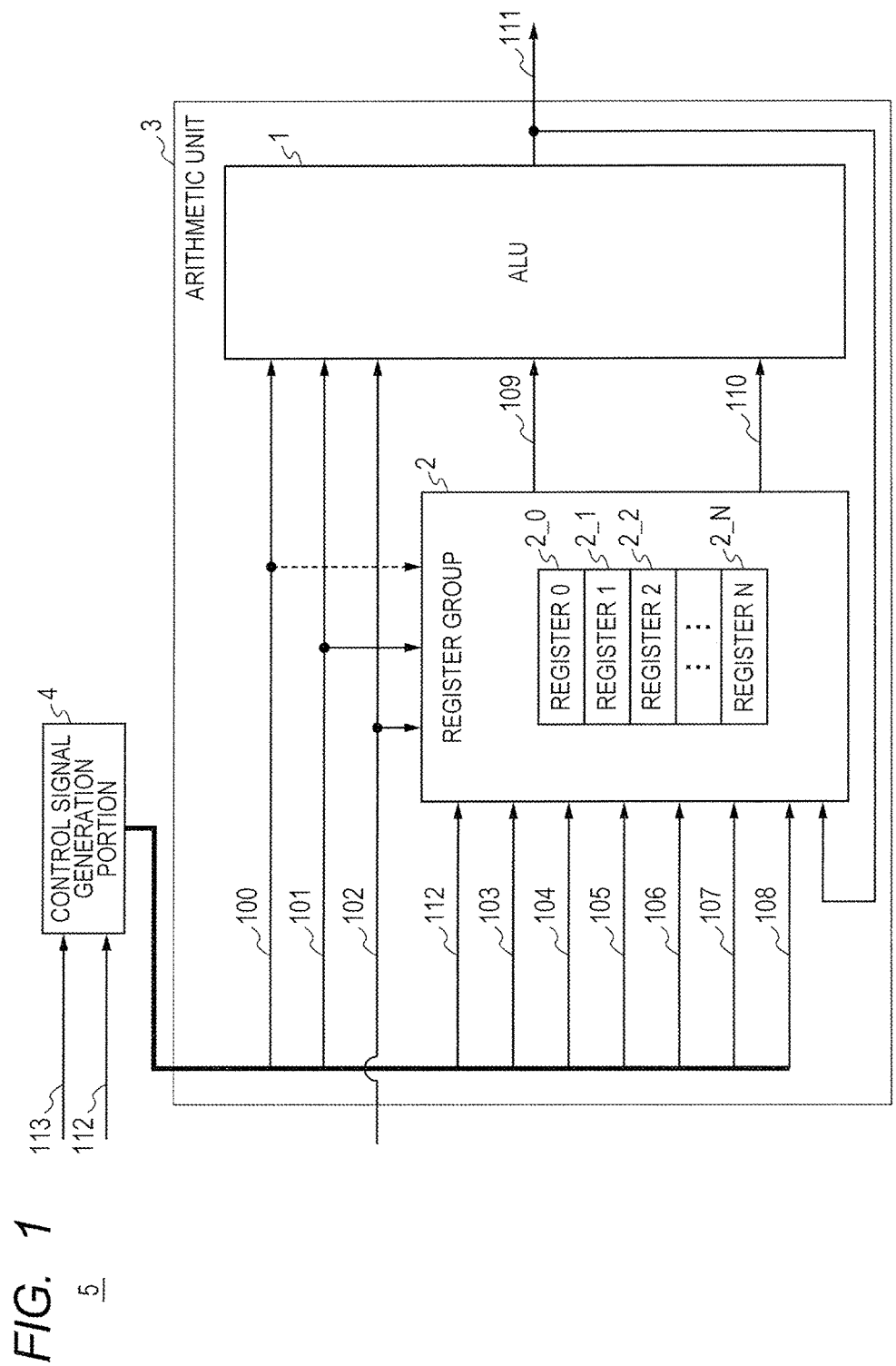
FIG. 1 is a block diagram schematically illustrating a configuration of a major part of a CPU according to a first embodiment.

Embodiments of the present invention will be described in further detail with reference to the accompanying drawings. The mutually corresponding parts or equivalents in the embodiments are designated by the same reference numerals and a description is omitted for simplicity.

First Embodiment

CPU Configuration

FIG. 1 is a block diagram schematically illustrating a configuration of a major part of a CPU according to the first embodiment. As illustrated in FIG. 1, a CPU 5 includes an arithmetic unit 3 and a control signal generation portion (control unit) 4. The arithmetic unit 3 includes a register group 2 containing registers 1 through N (2_0 through 2_N) and an arithmetic logic unit (ALU) 1.

The control signal generation portion 4 is supplied with memory data 113 and a system clock as major signals. The memory data 113 contains instructions and data the CPU 5 reads from external memory (storage device). The system clock 112 denotes a clock signal supplied to many circuits in the CPU 5. The control signal generation portion 4 and the register group 2 operate in synchronization with the system clock 112 input from the outside.

The control signal generation portion 4 selects two sets of data sources (data 1 and data 2) from those stored in the register group 2 when performing instructions using the ALU 1 (e.g., arithmetic operations and logical operations). The ALU 1 performs operations specified by instructions using the data 1 and 2 as input data.

The control signal generation portion 4 outputs many control signals to the arithmetic unit 3 to control it when the operations are performed. Specifically, the arithmetic unit 3 selects one or more (usually two) registers out of (N+1) registers 2_0 through 2_N according to data source selection signals 1 and 2 (104 and 105). Source data stored in the selected registers are output as input data (data 1 (109) and data 2 (110)) to the ALU 1. Operation blocks (not shown) in the ALU 1 concurrently perform operations for the two input data 109 and 110 supplied from the register group 2 and output an operation result 111 corresponding to the operation type specified by an operation type selection signal 100. Depending on ALU designs, the ALU 1 may be supplied with data valid for only operation blocks that are included in the ALU 1 and correspond to the operation types specified by the operation type selection signal 100. The operation result 111 output from the ALU 1 may be used outside the arithmetic unit 3 or may be written to the register group 2 in the arithmetic unit 3. A write register selection signal 106 and a write enable signal 107 control writing to the register group 2. The register group 2 is also supplied with a reset signal 103.

Figure 3A:
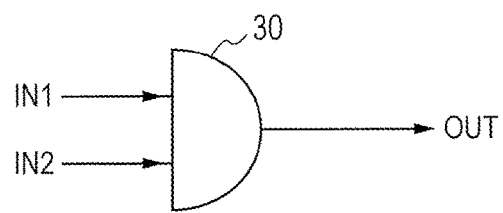
FIGS. 3A and 3B illustrate an AND gate design method.
Figure 3B:
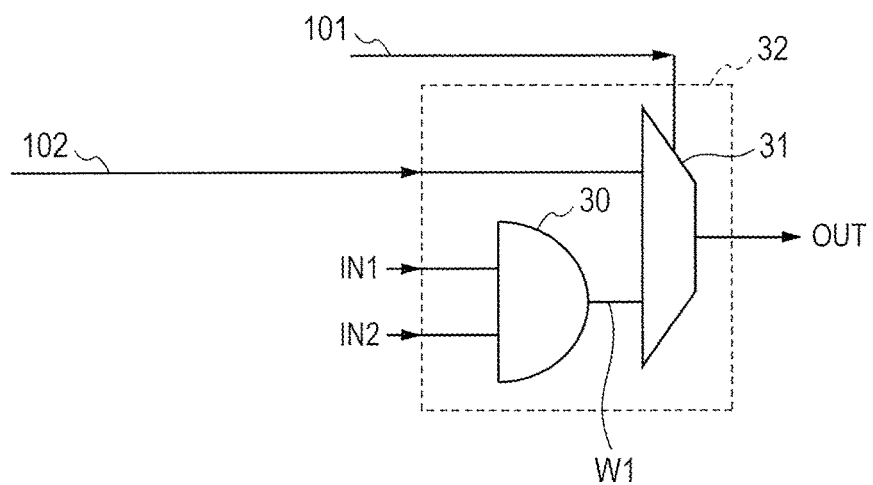

The arithmetic unit 3 in FIGS. 3A and 3B differs from arithmetic units of the related art in that a changeover control signal 101 and a changeover data signal 102 are input to the ALU 1 and the register group 2. The changeover control signal 101 includes one bit to represent an active state and an inactive state. The changeover data signal 102 includes multiple bits and is used irrelevantly to source data used for operations performed by the arithmetic unit 3.

Figure 2:
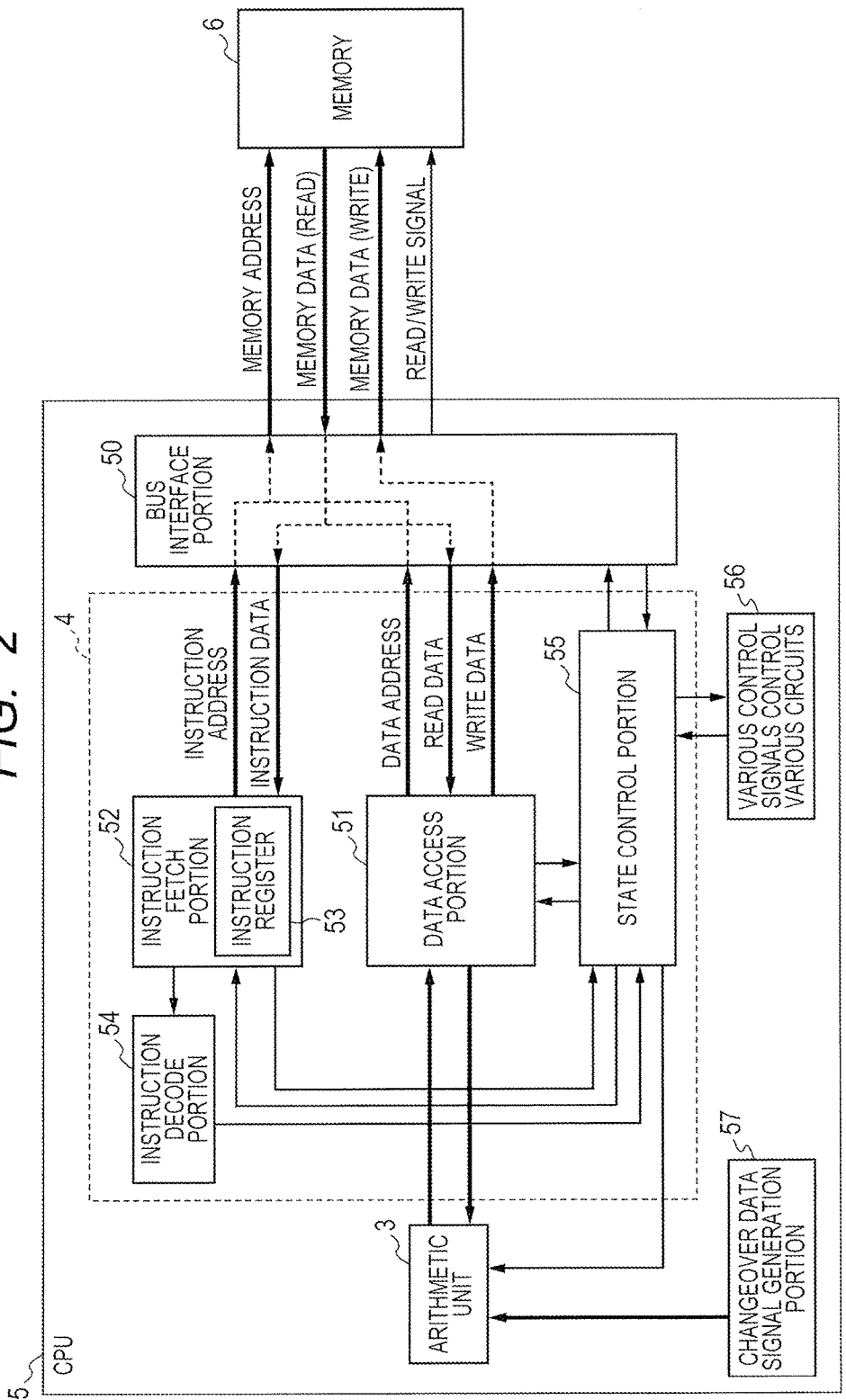
FIG. 2 is a block diagram illustrating in detail the configuration of the CPU in FIG. 1.

FIG. 2 is a block diagram illustrating in detail the configuration of the CPU in FIG. 1. In FIG. 2, address signals and data signals are indicated by thick arrows. Control signals are indicated by thin arrows. As illustrated in FIG. 2, the control signal generation portion 4 in FIG. 1 includes a data access portion 51, an instruction fetch portion 52, an instruction decode portion 54, and a state control portion 55.

The data access portion 51 is coupled to external memory 6 via a bus interface portion 50, writes data to a specified address in the memory 6, or reads data from a specified address. The instruction fetch portion 52 is coupled to the external memory 6 via the bus interface portion 50 and reads an instruction from a specified address in the memory 6. Read instructions are stored in an instruction register 53.

The instruction decode portion 54 decodes the contents of the instruction register 53 and interprets instruction types (operation codes) and data (operands) used for instructions.

The state control portion 55 maintains CPU states and updates states and generates various control signals based on the current state and instruction decoding results. The various control signals control various circuits 56 included in a CPU 5A as well as the arithmetic unit 3.

The CPU 5 is moreover provided with a changeover data signal generation portion 57. The changeover data signal generation portion generates a changeover data signal 102. The changeover data signal generation portion 57 is available as a random number generation source or a quasi-random number generator, for example. The changeover data signal generation portion 57 may generate the changeover data signal 102 using values of a system clock or a timer while operations are performed. A dedicated register or shift register may be provided as the changeover data signal generation portion 57. Contents stored in the dedicated register or shift register are used as the changeover data signal 102. The dedicated register or shift register may be provided in the register group 2 illustrated in FIG. 1.

Changes in the Circuit Elements

The arithmetic unit 3 according to the first embodiment can change states of internal signals and output signals of the arithmetic unit 3 to states irrelevant to arithmetic operations without greatly changing the existing design. Specifically, as described in Japanese Unexamined Patent Publication No. 2011-234312 (patent document 1), at least part of circuit elements such as logical gates and flip-flops included in the arithmetic unit is capable of changing an output signal to the changeover data signal 102 according to the changeover control signal 101. When the changeover control signal 101 is activated (asserted), the arithmetic unit 3 can change states of internal signals and output signals to states irrelevant to arithmetic operations. When the changeover control signal 101 is inactivated (negated), the arithmetic unit 3 operates as usual without prevention against power analysis attack. With reference to FIGS. 3 through 6, the following describes changes in the circuit elements.

Figure 4A:
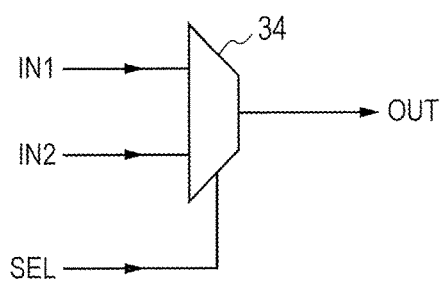
FIGS. 4A and 4B illustrate a selector design method.
Figure 4B:
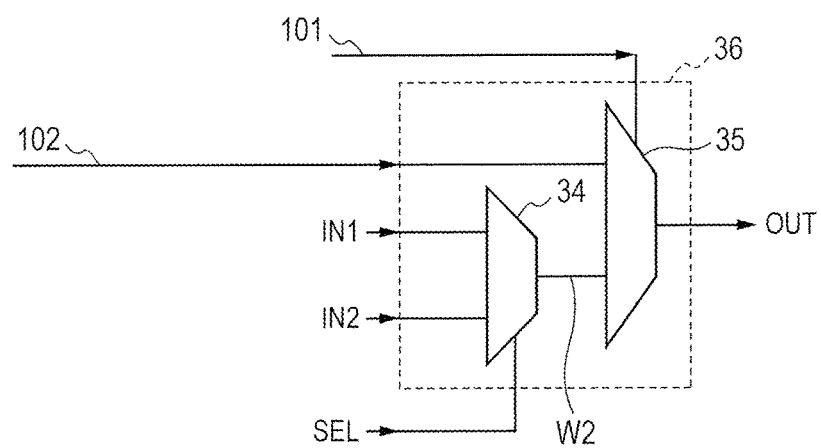
Figure 5A:
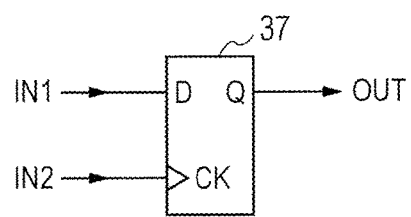
FIGS. 5A and 5B illustrate a D-type flip-flop design method.
Figure 5B:
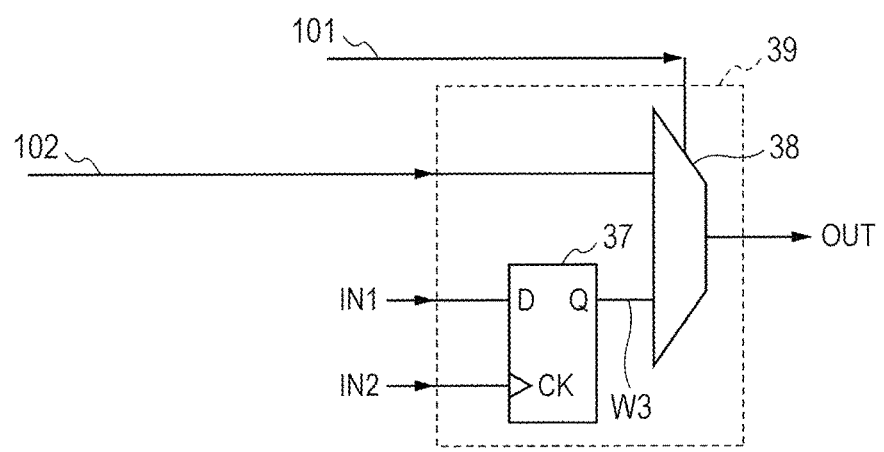

FIGS. 3A and 3B illustrate an AND gate design method. FIGS. 4A and 4B illustrate a selector design method. FIGS.

5A and 5B illustrate a D-type flip-flop design method. FIGS. 3A through 5A correspond to existing circuits (before design change). FIGS. 3B through 5B correspond to circuits after design change. The arithmetic unit 3 is typically designed according to steps shown below.

(1) Design circuits for an ALU and a register group according to the related art.

(2) Insert selectors 31, 35, and 38 in series subsequent to part of circuit elements such as logical gates (an AND gate 30 in FIGS. 3A and 3B and a selector 34 in FIGS. 4A and 4B) and a flip-flop (a D-type flip-flop 37 in FIGS. 5A and 5B) included in the arithmetic unit.

(3) Apply the changeover control signal 101 and the changeover data signal 102 to the selectors 31, 35, and 38 inserted at (2). When the changeover control signal 101 is active, the selectors 31, 35, and 38 output the changeover data signal 102 instead of an output signal from a related circuit element. The above-mentioned steps complete circuit elements 32, 36, and 39 after the change.

Figure 6A:
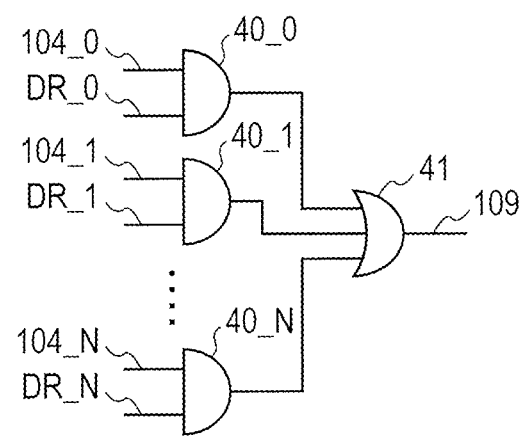
FIGS. 6A and 6B illustrate a circuit configuration example of part of the register group in FIG. 1 that outputs a data signal to an ALU.
Figure 6B:
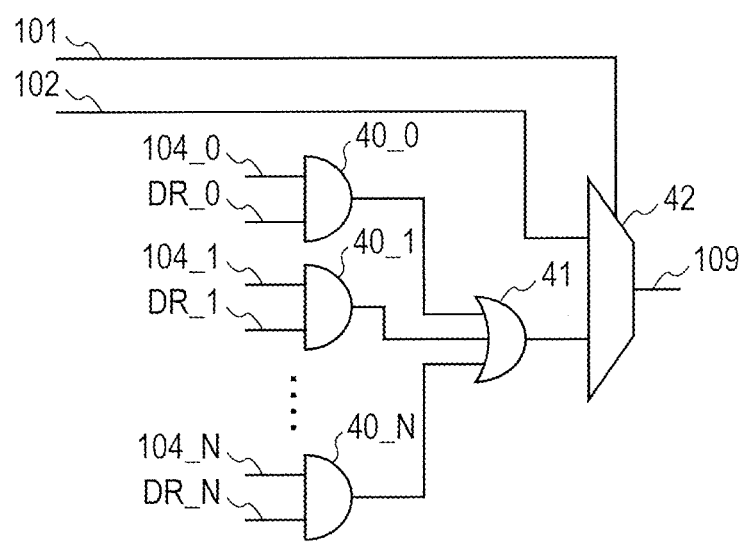

FIG. 6 illustrate a circuit configuration example of part of the register group in FIG. 1 that outputs a data signal to an ALU. FIG. 6A corresponds to a circuit configuration of the related art. FIG. 6B corresponds to a circuit configuration after design change. The circuit configuration in FIGS. 6A and 6B outputs the data signal 1 (109). A similar circuit configuration outputs the data signal 2 (110).

With reference to FIG. 6A, part of the circuit to output the data signal 1 (109) includes AND gates 40_0 through 40_N and an OR gate 41. The AND gates 40_0 through 40_N are supplied with output data DR_0 through DR_N from the registers 0 through N (2_0 through 2_N). The OR gate 41 is supplied with outputs from the AND gates 40. The other nodes of the AND gates 40 are supplied with corresponding data source selection signals 104 (104_0 through 104_N).

With reference to FIG. 6B, the circuit after the design change includes a selector (selection circuit) 42 coupled to the output node of the OR gate 41. The selector 42 is supplied with an output from the OR gate 41, the changeover control signal 101, and the changeover data signal 102. When the changeover control signal 101 is asserted, the selector 42 outputs the changeover data signal 102 as the data signal 1 (109) instead of an output signal from the OR gate 41.

CPU Operations

Figure 7:
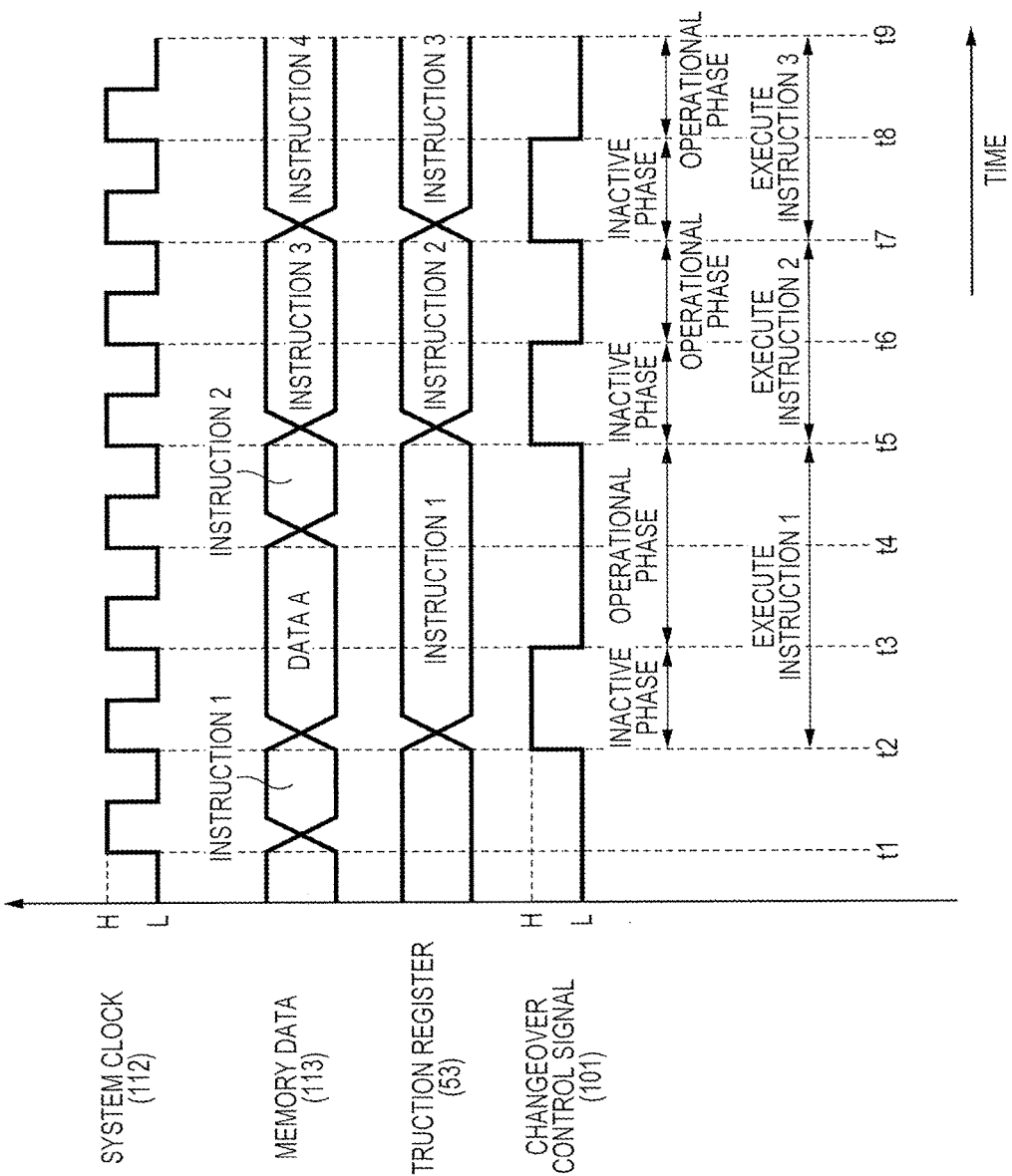
FIG. 7 is a timing chart illustrating operations of the CPU in FIG. 1.

FIG. 7 is a timing chart illustrating operations of the CPU in FIG. 1. FIG. 7 illustrates, from the top to the bottom, waveforms of the system clock 112, the memory data 113 (instruction data and read data 108) read from the memory 6 in FIG. 2, instruction data maintained in the instruction register 53 in FIG. 2, and the changeover control signal 101.

With reference to FIG. 7, instruction 1 is read from the memory during a period (fetch cycle) from time t1 to t2 and is executed during a period (execution cycle) from time t3 to t5. Instruction 2 is read from the memory during a period (fetch cycle) from time t4 to t5 and is executed during a period (execution cycle) from time t5 to t7. Instruction 3 is read from the memory during a period (fetch cycle) from time t5 to t7 and is executed during a period (execution cycle) from time t7 to t9.

In FIG. 7, it should be noted that the changeover control signal 101 output from the control signal generation portion 4 in FIG. 1 is activated (H level) at the first one-clock cycle of each execution cycle. The first one-clock cycle of each execution cycle causes states of internal signals and output signals of the arithmetic unit 3 to be irrelevant to arithmetic operations. The next clock cycle and later perform an arithmetic operation using source data stored in a register selected from the register group 2. At each execution cycle, a period corresponding to the first one-clock cycle is referred to as an inactive phase and a period corresponding to the next clock cycle and later is referred to as an operational phase in the following description.

Effects of the First Embodiment

The above-mentioned configuration and operations of the CPU 5 can improve the resistance to power analysis attack by assuming the first one-clock cycle of each execution cycle to be the inactive phase. An instruction using the ALU 1 requires no change in the program because the inactive phase is automatically inserted immediately before the operational phase. A difference from CPU operation of the related art is that the inactive phase of one clock cycle is inserted immediately before the operational phase. That is, removing one clock cycle for the inactive phase from FIG. 7 provides the CPU operation of the related art. The system clock frequency need not be lower than the related art.

Second Embodiment

CPU Configuration

Figure 8:
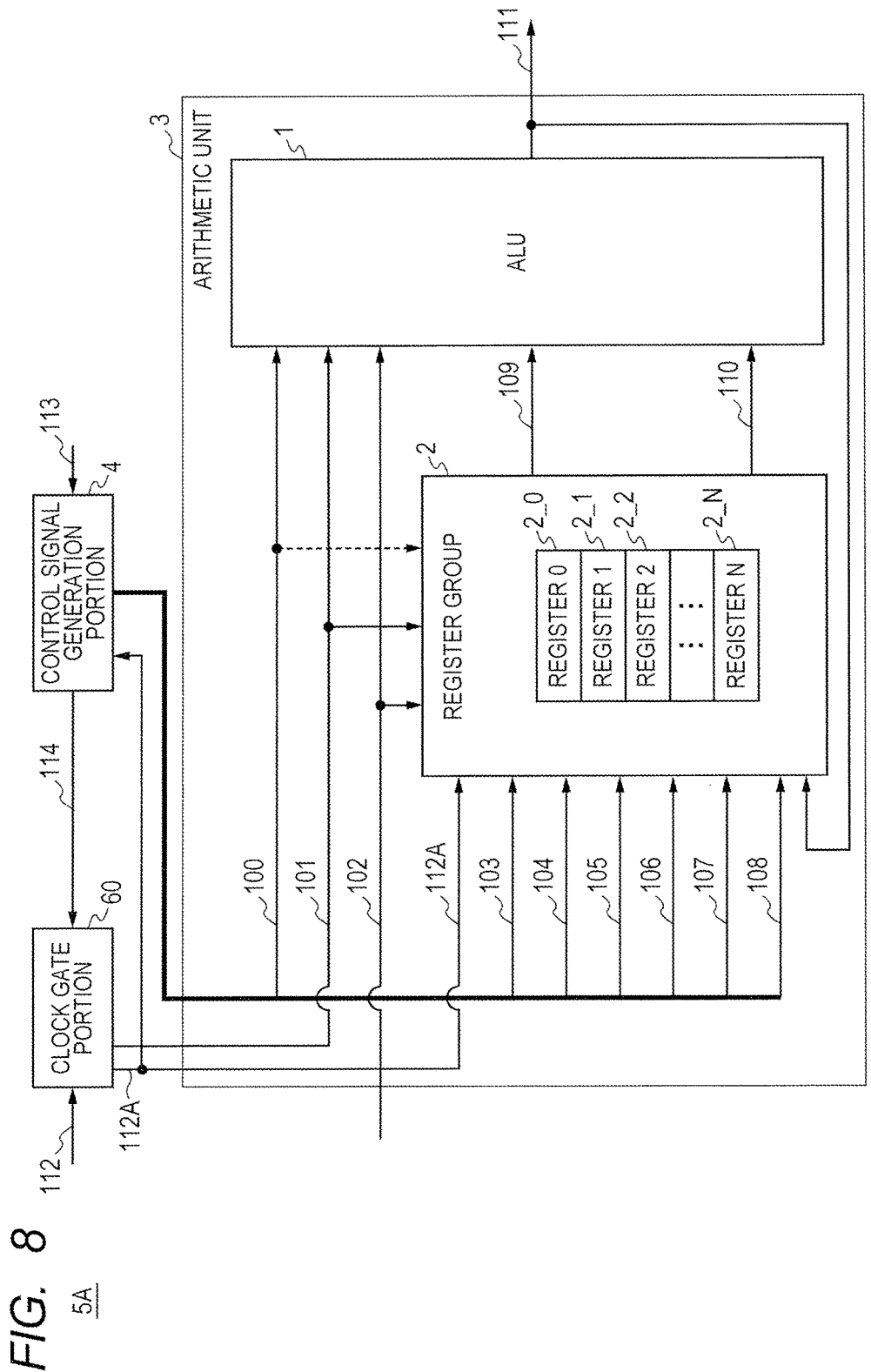
FIG. 8 is a block diagram schematically illustrating a configuration of a major part of a CPU according to a second embodiment.

FIG. 8 is a block diagram schematically illustrating a configuration of a major part of a CPU according to the second embodiment. With reference to FIG. 8, the CPU 5A according to the second embodiment differs from the CPU 5 according to the first embodiment in that a clock gate portion 60 is moreover included. According to the second embodiment, the control signal generation portion 4 and the register group 2 operate based on a gated clock 112A generated from the clock gate portion 60, not on the system clock 112.

Figure 9:
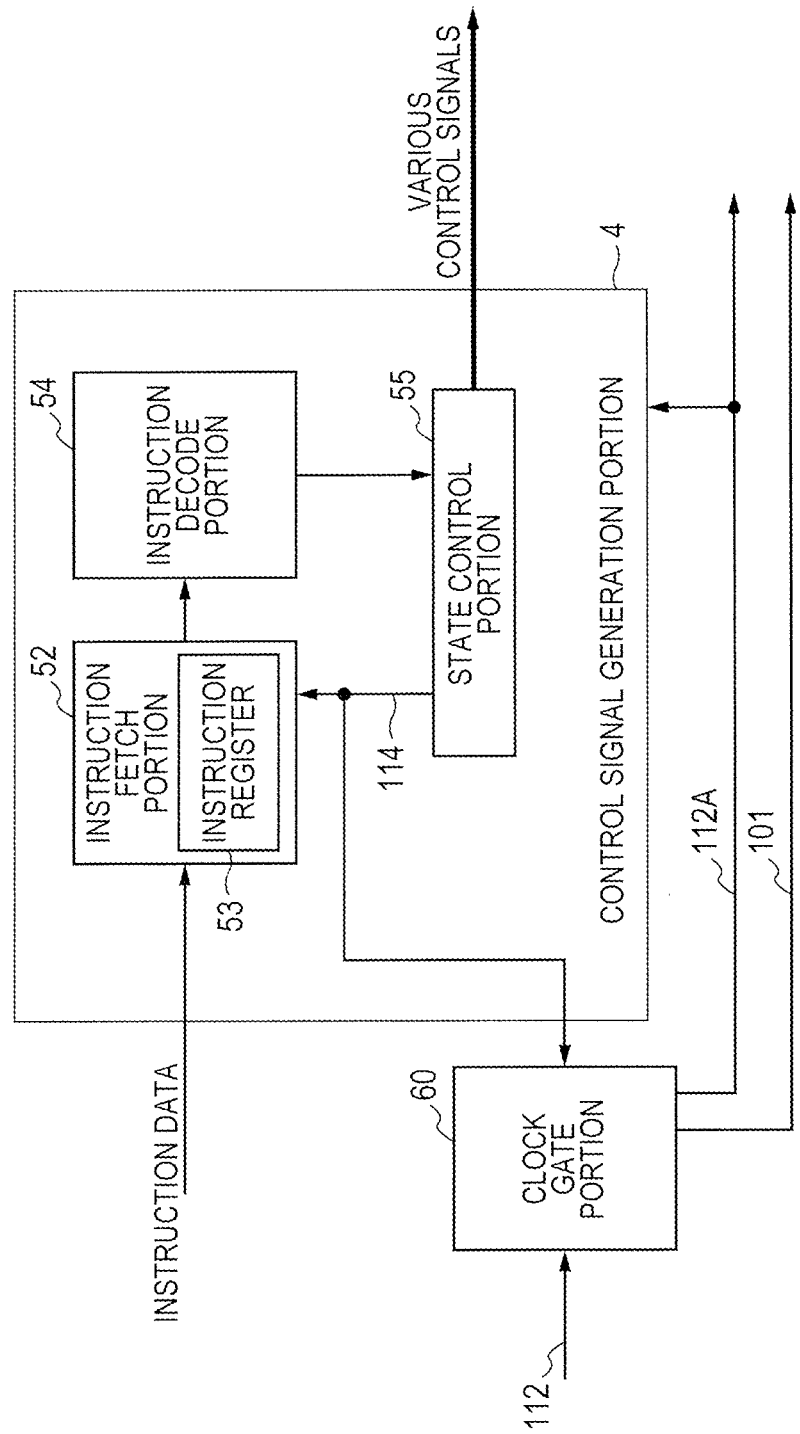
FIG. 9 is a block diagram schematically illustrating a configuration of a major part of a control signal generation portion in FIG. 8.
Figure 10:
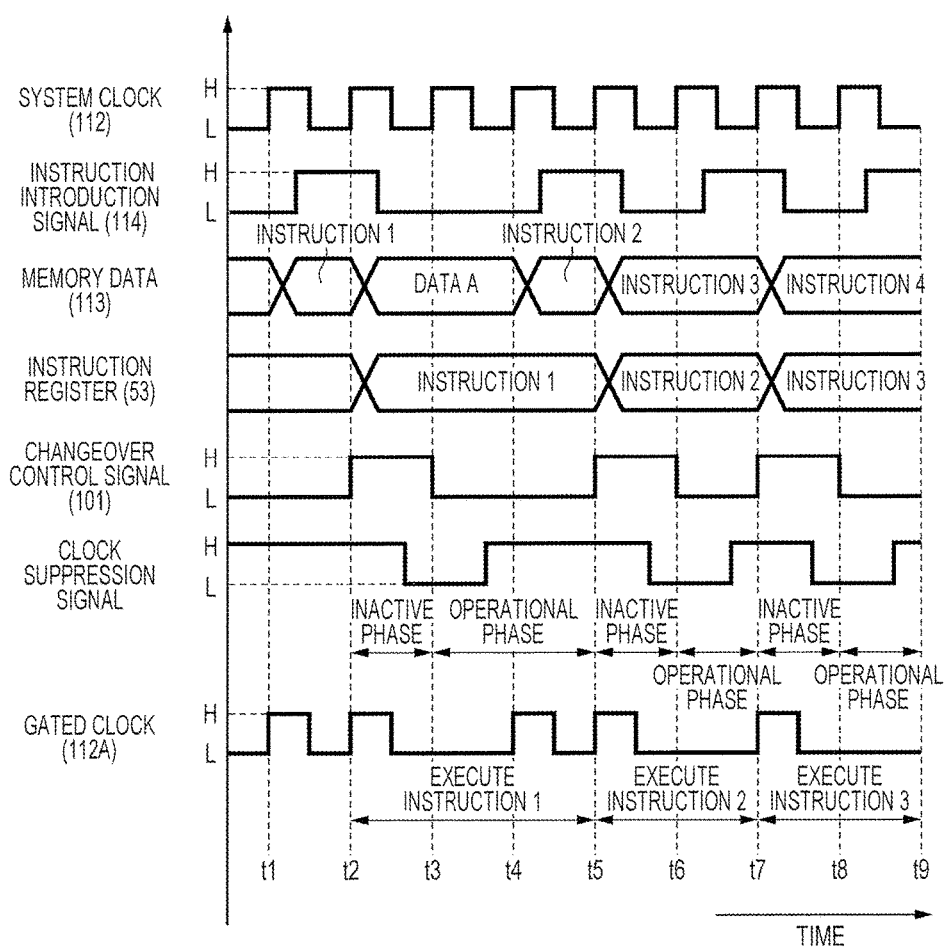
FIG. 10 is a timing chart illustrating operations of the CPU in FIG. 8.

FIG. 9 is a block diagram schematically illustrating a configuration of a major part of the control signal generation portion in FIG. 8. FIG. 10 is a timing chart illustrating operations of the CPU in FIG. 8. FIG. 10 illustrates, from the top to the bottom, waveforms of the system clock 112, an instruction introduction signal 114, the memory data 113 read from the external memory, instruction data maintained in the instruction register 53, the changeover control signal 101, and a clock suppression signal, and the gated clock 112A.

With reference to FIGS. 9 and 10, the control signal generation portion 4 includes the instruction fetch portion 52, the instruction decode portion 54, and the state control portion 55. Operations of these constituent elements are already described with reference to FIG. 2 and a description is omitted for simplicity. As a supplement, the instruction fetch portion 52 stores the memory data 113 (instruction data in this case) in the instruction register 53 if the instruction introduction signal 114 is set to the H level (1) at the rising timing of the system clock 112 or more specifically the gated clock 112A. The state control portion 55 checks whether the memory data read from the external memory is an instruction or data. If the memory data is an instruction, the state control portion 55 sets the instruction introduction signal 114 to the H level and stores the read data in the instruction register 53.

The clock gate portion 60 receives the system clock 112 and receives the instruction introduction signal 114 from the control signal generation portion 4. As illustrated in FIG. 10, the clock gate portion 60 introduces the instruction introduction signal 114 into an internal register at the rising timing of the system clock. An output from the register equals the changeover control signal 101 in FIG. 8.

The changeover control signal 101 is latched at the falling timing of the system clock 112 to equal the clock suppression signal. The clock gate portion 60 performs AND operation between the clock suppression signal and the system clock 112. The clock gate portion 60 supplies the result as the gated clock 112A to the other circuits (the control signal generation portion 4 and the register group 2).

FIG. 10 emphasizes a delay of only the clock suppression signal with reference to the system clock 112. However, the other signals (changeover control signal 101 and gated clock 112A) also delay with reference to the system clock 112.

CPU Operations

With reference to FIGS. 8 through 10, the following describes operations of the CPU 5A according to the second embodiment.

The changeover control signal 101 goes to the H level in the clock cycles for the system clock in which the instruction register 53 is updated during the periods between t2 and t3, between t5 and t6, and between t7 and t8 in FIG. 10. Internal states (states of internal signals and output signals) of the arithmetic unit 3 in FIG. 8 are irrelevant to arithmetic operation. These periods are referred to as the inactive phase. Except the inactive phase, instructions stored in the instruction register 53 are executed in the clock cycles for the system clock during the period between t3 through t5, the period between t6 and t7, and the period subsequent to t8 in FIG. 10. These periods are referred to as the operational phase. During the inactive phase, the arithmetic unit 3 performs arithmetic operation on meaningless data. During the operational phase, the arithmetic unit 3 performs arithmetic operation based on data stored in the register selected from the register group 2.

The gated clock 112A is a signal that is inactive during one clock cycle (for the system clock) next to the inactive phase corresponding to the periods between t3 and t4, between t6 and t7, and between t8 and t9 in FIG. 10. The circuits (the register group 2 and the control signal generation portion 4) supplied with the gated clock 112A stop the clock in the operational phase immediately after the inactive phase. This prevents the accidental use of a result of the operation performed by the arithmetic unit 3 on meaningless data. The instruction fetch is also inactive in the operational phase immediately after the inactive phase. The memory address is unchanged. The memory data 113 read from the memory based on the memory address is also unchanged.

In the inactive phase, the control signal generation portion 4 correctly generates various control signals. The control signal maintains its state until the clock is supplied next. Therefore, the control signal remains unaffected even if the clock is inactive in the operational phase immediately after the inactive phase.

Figure 11:
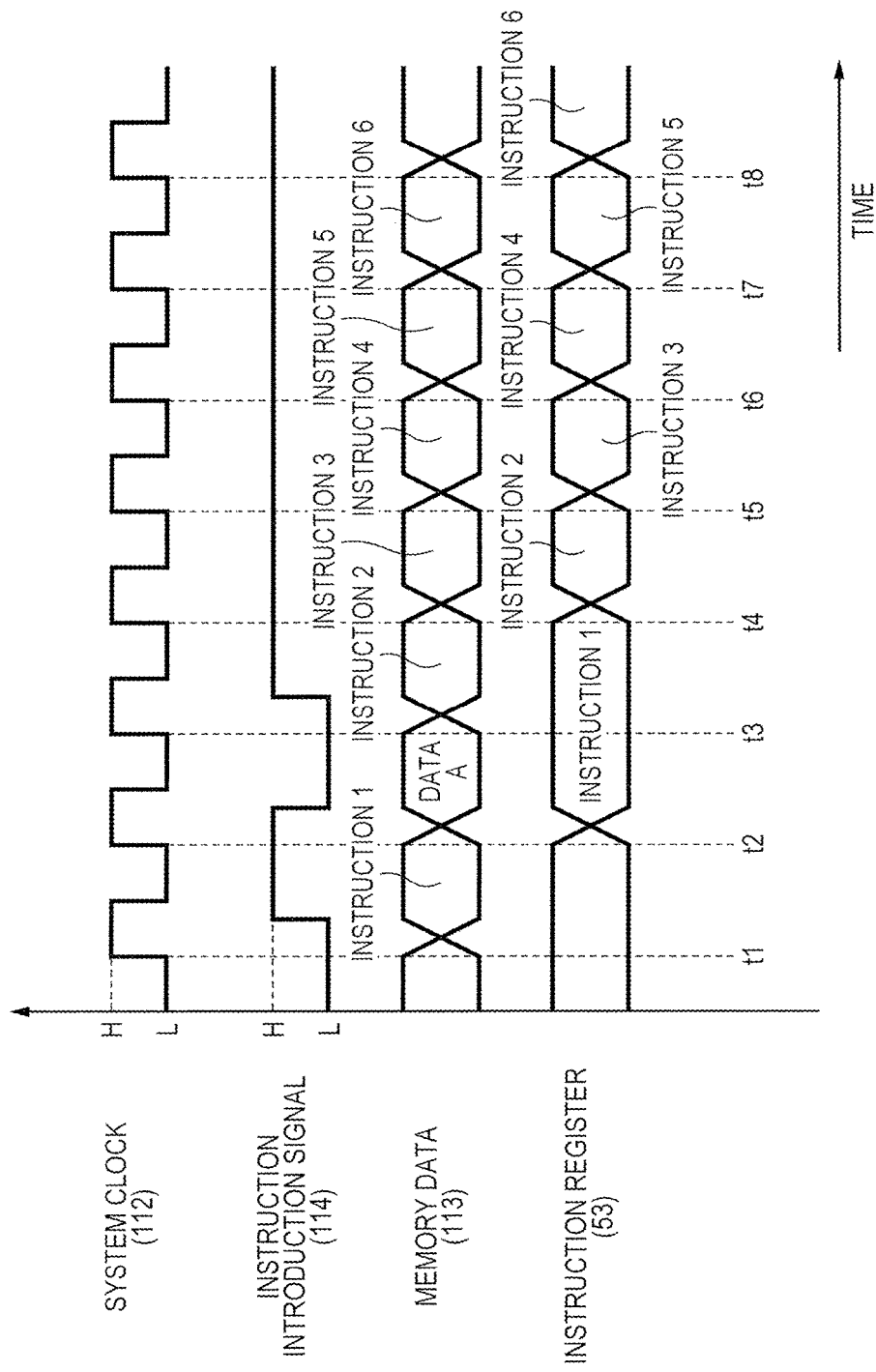
FIG. 11 illustrates operations of a CPU of the related art as a comparative example of FIG. 10.

FIG. 11 illustrates operations of a CPU of the related art as a comparative example of FIG. 10. In FIG. 11, the clock gate portion 60 in FIG. 8 is eliminated. The control signal generation portion 4 and the register group 2 operate based on the system clock 112. The CPU operates while the changeover control signal 101 is always inactive. In FIG. 11, the memory data 113 is incorporated from the external memory in the same order as that in FIG. 10.

In FIG. 11, assume instruction 2 to be an arithmetic instruction, for example. Instruction 2 is fetched during one clock cycle (fetch cycle) from time t3 to t4. Instruction 2 is executed during one clock cycle (execution cycle) from time t4 to t5. An operation result of instruction 2 is written to a register selected from the register group during one clock cycle from time t5 to t6. The period from time t5 to t6 corresponds to the execution cycle for the next instruction 3.

According to the second embodiment as illustrated in FIG. 10, instruction 2 is executed at two clock cycles corresponding to the inactive phase (from time t5 to t6) and the operational phase (from time t6 to t7). The inactive phase performs arithmetic operation using meaningless data. The gated clock 112A is inactive in the next operational phase. Consequently, an operation result from the inactive phase is not written to the register group. The control signal is generated during the inactive phase and its state is maintained in the next operational phase. Consequently, the operational phase performs arithmetic operation using normal data. An operation result of instruction 2 is written to the register group 2 during the next period from time t7 to t8. This period corresponds to the inactive phase for next instruction 3.

As described above, the gated clock 112A is used to increase the instruction execution time (execution cycle) one clock cycle for the system clock. The gated clock 112A does not fetch an instruction or write an operation result in the operational phase immediately after the inactive phase, keeping CPU operation consistent.

Effects of the Second Embodiment

The following summarizes how the CPU 5A according to the second embodiment executes instructions.

In the inactive phase (the first one-clock cycle of execution cycles), execution of an arithmetic instruction uses data irrelevant to original source data stored in the register group 2. The other circuit operations (e.g., control signal generation) in the inactive phase basically equal those of the related art.

Changing the inactive phase to the operational phase changes the changeover control signal 101 to the L level. Input to the ALU 1 is changed to the normal source data. In this case, the gated clock 112A inactivates the register group 2, preventing the register group 2 from storing meaningless arithmetic results in the inactive phase. The operational phase immediately after the inactive phase maintains control signals already generated in the inactive phase such as the operation type selection signal 100, the data source selection signals 104 and 105, and the write register selection signal 106. The ALU 1 performs arithmetic operation using the normal source data. The result is stored in the register group 2 at the next clock cycle.

The CPU 5A according to the second embodiment can provide simple control of using the gated clock to change internal signals of the arithmetic unit and output signals from the same to states irrelevant to arithmetic operations without affecting original operations of the arithmetic unit 3. In this case, there is no need to insert a special instruction into the program or decrease the clock frequency.

Third Embodiment

Problem Solved by the Third Embodiment

Some types of instructions may need not change internal signals of the arithmetic unit and output signals from the same to states irrelevant to arithmetic operations in order to improve the resistance to power analysis attack. The first and second embodiments cause the inactive phase to all instruction including these types of instructions and therefore increase the instructions execution time. The third embodiment provides a means to insert the inactive phase and eliminate the instruction execution time for only the execution cycle of instructions requiring the protection against power analysis attack.

CPU Configuration

Figure 12:
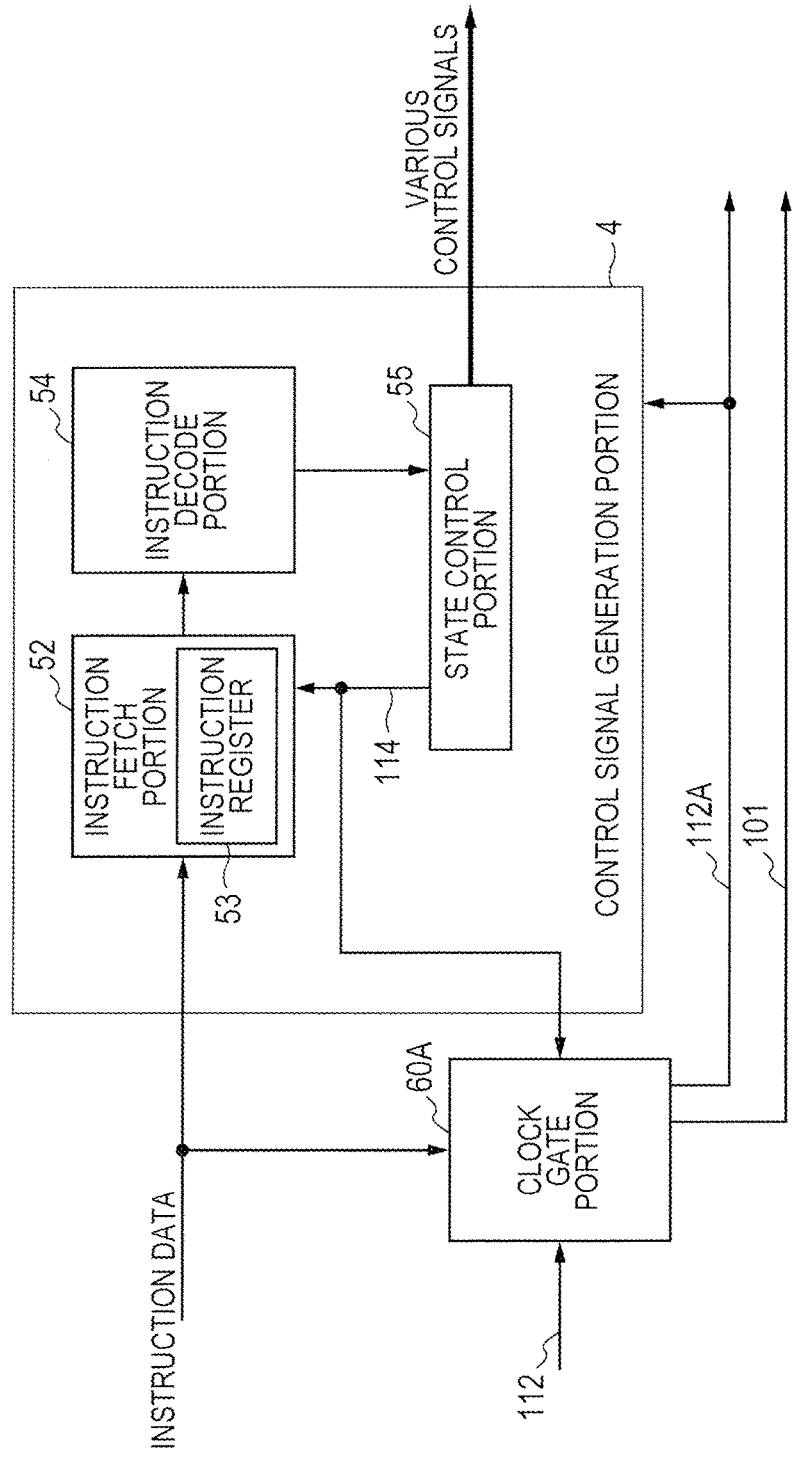
FIG. 12 is a block diagram illustrating a configuration of a control signal generation portion and a clock gate portion in the CPU according to the third embodiment.

FIG. 12 is a block diagram illustrating a configuration of a control signal generation portion and a clock gate portion in the CPU according to the third embodiment.

A clock gate portion 60A in FIG. 12 differs from the clock gate portion 60 in FIG. 9 in that a fetched instruction is moreover input. The clock gate portion 60A activates the instruction introduction signal 114 (H level) at the rising timing of the system clock 112. The clock gate portion 60A activates the changeover control signal 101 (H level) only when the type (operation code) of instruction data is predetermined or not. To provide this signal processing, for example, the clock gate portion 60A is appended by a simple decode circuit that decodes the operation code of fetched instruction data. The decode result is logically AND'ed with the instruction introduction signal 114 and is latched at the rising timing of the system clock to provide the changeover control signal 101.

The other points in FIG. 12 are similar to those in FIG. 9. The mutually corresponding parts or equivalents are designated by the same reference numerals and a description is omitted for simplicity. For example, the clock gate portion 60 in FIG. 9 and the clock gate portion 60A in FIG. 12 use the same method to generate the clock suppression signal and the gated clock 112A. As described above, however, the method to generate the changeover control signal 101 differs. Waveforms of the clock suppression signal and the gated clock 112A generated based on the changeover control signal 101 differ from those for the clock gate portion 60 in FIG. 9.

CPU Operations

Figure 13:
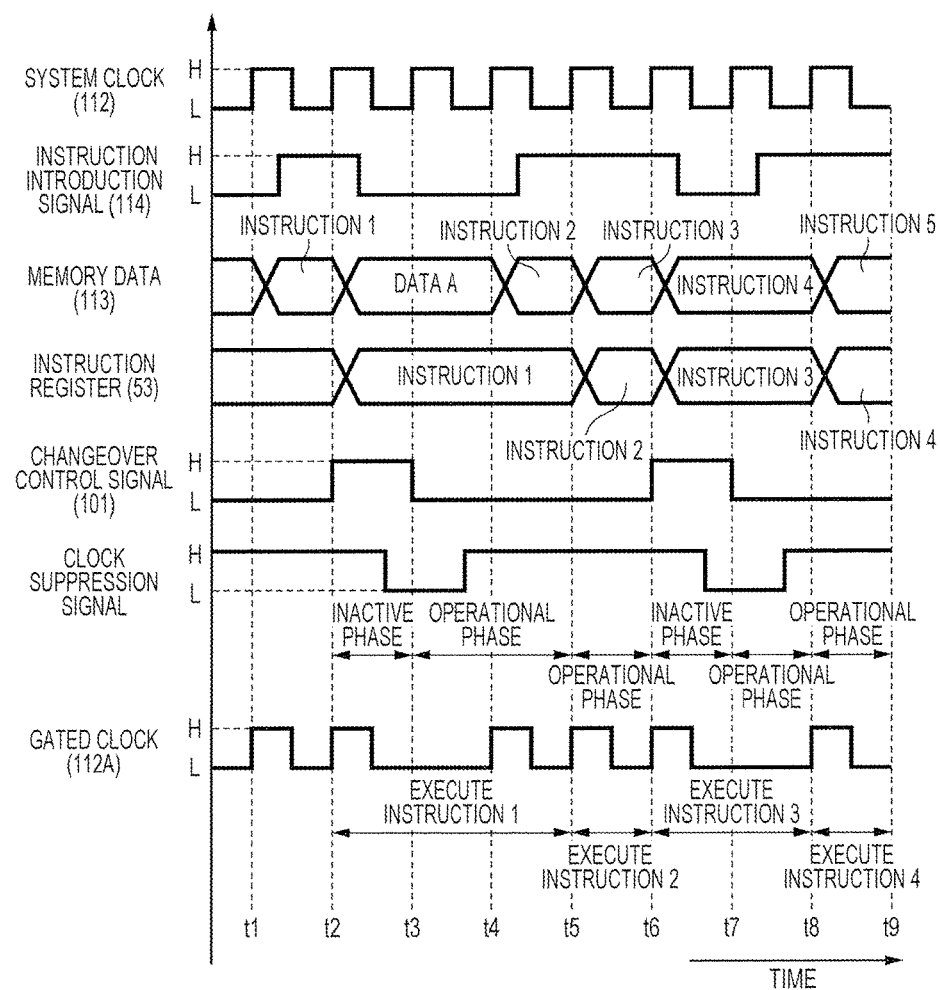
FIG. 13 is a timing chart illustrating operations of the CPU according to the third embodiment.

FIG. 13 is a timing chart illustrating operations of the CPU according to the third embodiment. Similar to FIG. 10, FIG. 13 illustrates, from the top to the bottom, waveforms of the system clock 112, the instruction introduction signal 114, the memory data 113 read from the external memory, the instruction data maintained in the instruction register 53, the changeover control signal 101, the clock suppression signal, and the gated clock 112A.

Instructions shown in the timing chart of FIG. 13 equal those shown in FIG. 10. Suppose instructions 2 and 4 to be a specific type of instructions that need not activate the changeover control signal 101 (H level) at the execution cycle. As a result, no inactive phase is inserted when instructions 2 and 4 are executed. The execution time for instructions 2 and 4 is shorter than that in FIG. 10 by one cycle of the system clock.

Fourth Embodiment

Problem Solved by the Fourth Embodiment

The arithmetic unit of the related art uses the circuit as illustrated in FIG. 6A to select data 1 and 2 (109 and 110) to be input to the ALU out of data stored in registers 1 through N (2_0 through 2_N).

For example, suppose the circuit in FIG. 6A changes a state of selecting data in register 3 to a state of selecting data in register 0. In such a case, transition of a register selection signal may temporarily output data in register 3 as data 1. Specifically, suppose that a register number is represented in three bits. Instruction data to be fetched contains a field to indicate the register number. The value of this field changes from 011 to 000. The instruction decoder may be supplied with a signal that transitions from 011, 010, to 000 due to the signal delay. The transition state corresponding to 010 may select register 2.

The transition of the register selection signal depends on the delay time that depends on wirings, for example. The transition is hardly estimated at the design stage. Confidential information if contained in register 2 may be vulnerable to power analysis attack during the above-mentioned signal transition. The reason follows. Data 1 and 2 (109 and 110) are input to many circuits in the ALU. A change in the corresponding signal operates many circuits. The confidential information causes high power consumption.

The arithmetic unit described in the first through third embodiments uses the modified circuit as illustrated in FIG. 6B. Even in this case, however, the above-mentioned problem (vulnerability to power analysis attack) may occur if the delay time of the changeover control signal 101 is longer than that of the register selection signal. The fourth embodiment provides the means to solve this problem.

CPU Configuration

Figure 14:
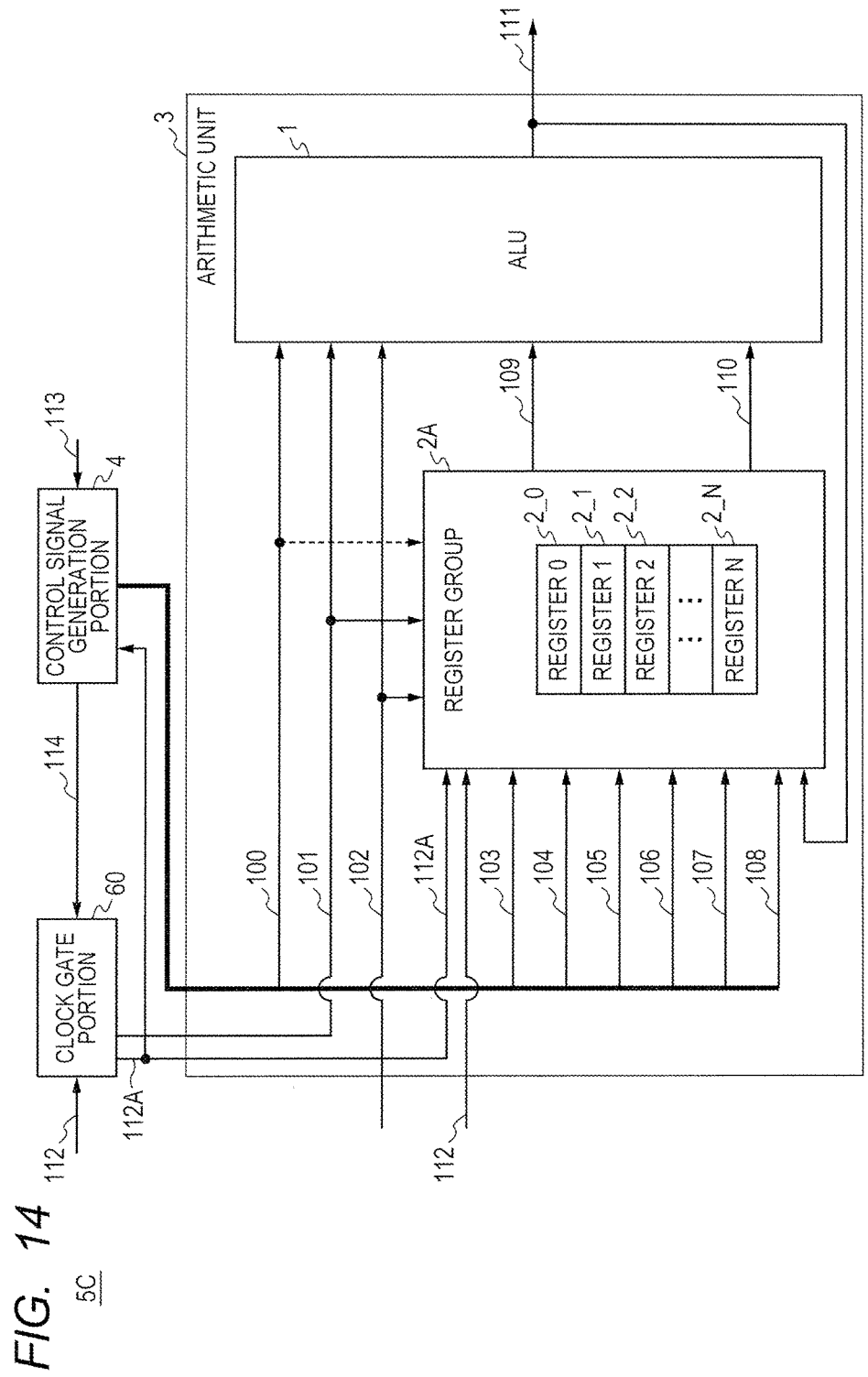
FIG. 14 is a block diagram schematically illustrating a configuration of a major part of a CPU according to a fourth embodiment.
Figure 15:
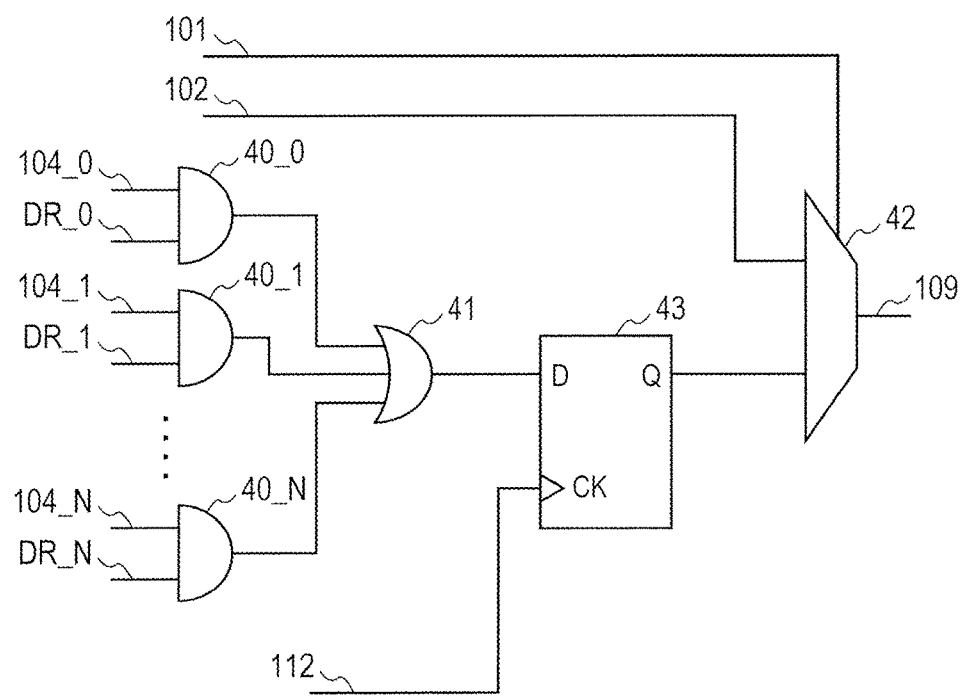
FIG. 15 illustrates a circuit configuration example of part of a register group in FIG. 14 that outputs a data signal to an ALU.

FIG. 14 is a block diagram schematically illustrating a configuration of a major part of a CPU according to the fourth embodiment. FIG. 15 illustrates a circuit configuration example of part of a register group in FIG. 14 that outputs a data signal to an ALU. FIG. 15 provides the circuit configuration that outputs data signal 1 (109). The same circuit configuration is used to output data signal 2 (110).

With reference to FIG. 14, a register group 2A is included in a CPU 5C according to the fourth embodiment and is supplied with the system clock 112 as well as the gated clock 112A. With reference to FIG. 15, a part of the circuit to output data signal 1 (109) from the register group 2A differs from that of FIG. 6B in that a source register (D-type flip-flop) 43 is inserted between the OR gate 41 and the selector 42. In the register group 2A according to the fourth embodiment, output data 1 and 2 (109 and 110) before output to the ALU are temporarily held in the corresponding source register 43. The source register 43 synchronizes with the system clock 112 instead of the gated clock 112A. The selector 42 receives the changeover data signal 102 and data held in the source register 43. If the changeover control signal 101 is activated, the selector 42 outputs the changeover data signal 102 as output data 1 (109) to the ALU. If the changeover control signal 101 is not activated, the selector 42 outputs data held in the source register 43 as output data 1 (109) to the ALU.

The other configurations in FIGS. 14 and 15 equal those in FIGS. 6B and 8 (i.e., the CPU 5 according to the second embodiment). The mutually corresponding parts or equivalents are designated by the same reference numerals and a description is omitted for simplicity.

CPU Operations and Effects of the Fourth Embodiment

Figure 16:
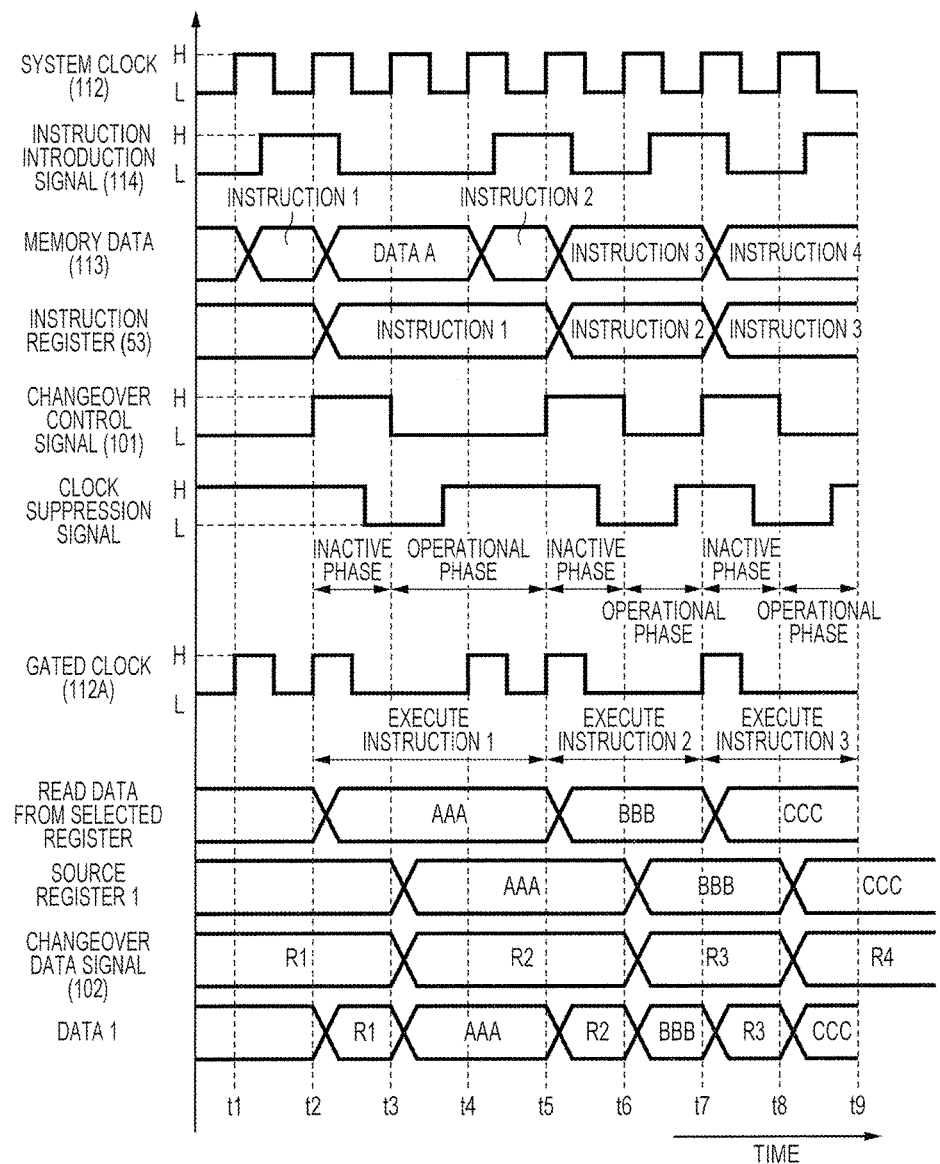
FIG. 16 is a timing chart illustrating operations of the CPU as illustrated in FIGS. 14 and 15.

FIG. 16 is a timing chart illustrating operations of the CPU as illustrated in FIGS. 14 and 15. In FIG. 16, waveforms of the system clock 112, the instruction introduction signal 114, the memory data 113 read from the external memory, the instruction data maintained in the instruction register 53, the changeover control signal 101, the clock suppression signal, and the gated clock 112A equal those illustrated in FIG. 10 and a description is omitted. FIG. 16 moreover shows data read from a register selected from the register group 2A, data held in source register 1 (43), the changeover data signal 102, and data 1 to be output from the selector 42 to the ALU. Source register 1 (43) denotes the source register 43 provided for a part to output data 1 (109).

The example in FIG. 16 assumes that AAA, BBB, and CCC are used as source data to execute instructions 1, 2, and 3, respectively. The changeover data signal 102 is assumed to change when the changeover control signal 101 changes to be inactive (at time t3, t6, and t8).

As illustrated in FIG. 16, the CPU according to the fourth embodiment outputs data (R1, R2, and R3) irrelevant to arithmetic operation to the ALU during one clock cycle (i.e., periods between t2 and t3, between t5 and t6, and between t7 and t8) before the ALU actually performs arithmetic operation (according to the system clock). During these periods, the CPU selects a register that stores data actually used for the arithmetic operation. At the next clock cycle (for the system clock), data actually used for the arithmetic operation is stored in source register 1 (43). The data stored in source register 1 (43) is output as data 1 to the ALU.

The above-mentioned signal transition does not propagate to data 1 and the ALU later than source register 1 (43), preventing high power consumption dependent on the confidential information. The fourth embodiment moreover improves the resistance to power analysis attack.

Modification

The source register 43 illustrated in FIG. 15 can be provided for the register group according to the third embodiment. In this case, the circuit in FIG. 15 is modified as illustrated in FIG. 17.

Figure 17:
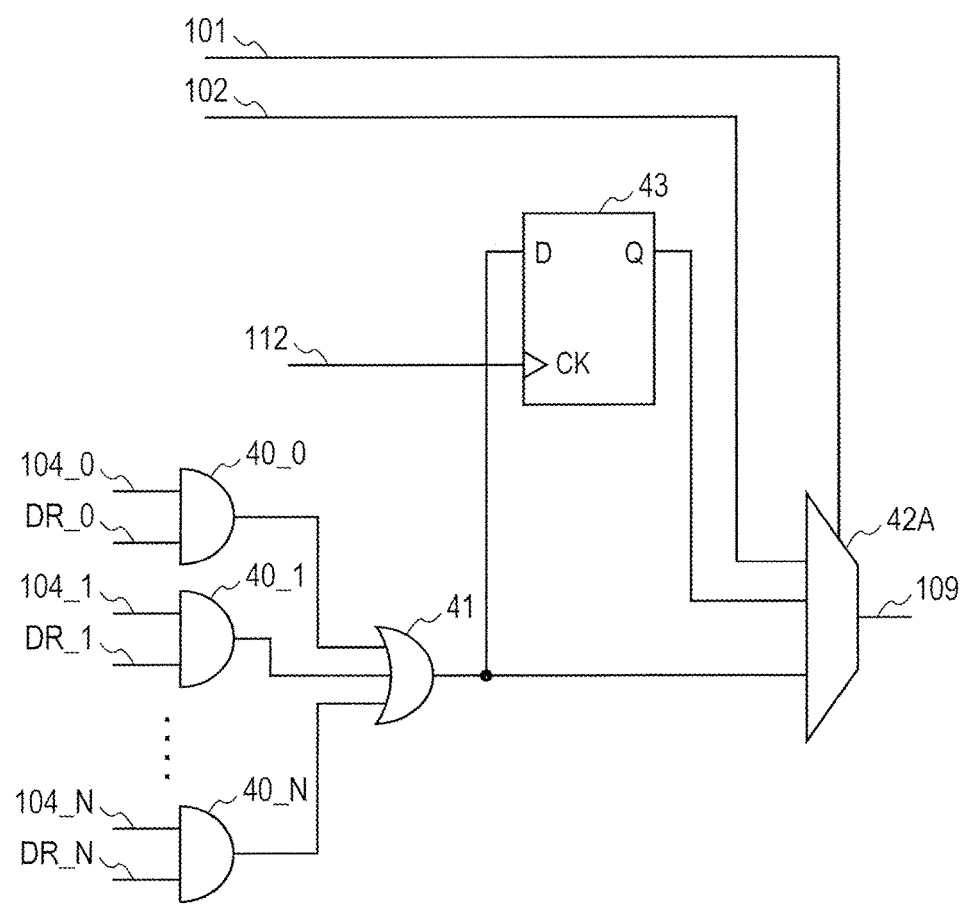
FIG. 17 is a circuit diagram illustrating a modification of FIG. 15.

FIG. 17 is a circuit diagram illustrating a modification of FIG. 15. With reference to FIG. 17, as a combination of the third and fourth embodiments, output from the OR gate 41 is directly input to a selector 42A without passing through the source register 43 as a third input signal. During execution of a specific type of instructions that insert the inactive phase into the execution cycle, the selector 42A outputs the changeover data signal 102 at the first one-clock cycle (inactive phase) of the execution cycle according to the changeover control signal 101 and outputs the content held in the source register 43 at the subsequent operational phase. During execution of instructions other than the special type (no inactive phase inserted), the selector 42A outputs an output from the OR gate 41 as data 1 to the ALU. The other points in FIG. 17 equal those in FIG. 15. The mutually corresponding parts or equivalents are designated by the same reference numerals and a description is omitted for simplicity.

Fifth Embodiment

Problem Solved by the Fifth Embodiment

A CPU 5D according to the fifth embodiment is capable of selecting one of a secure mode and a non-secure mode as the CPU operation mode. The secure mode changes internal signals of the arithmetic unit and output signals from the same to states irrelevant to arithmetic operations at the first one-clock cycle (inactive phase) of the execution cycle. The non-secure mode does not insert the inactive phase into the execution cycle.

CPU Configuration and Operations

Figure 18:
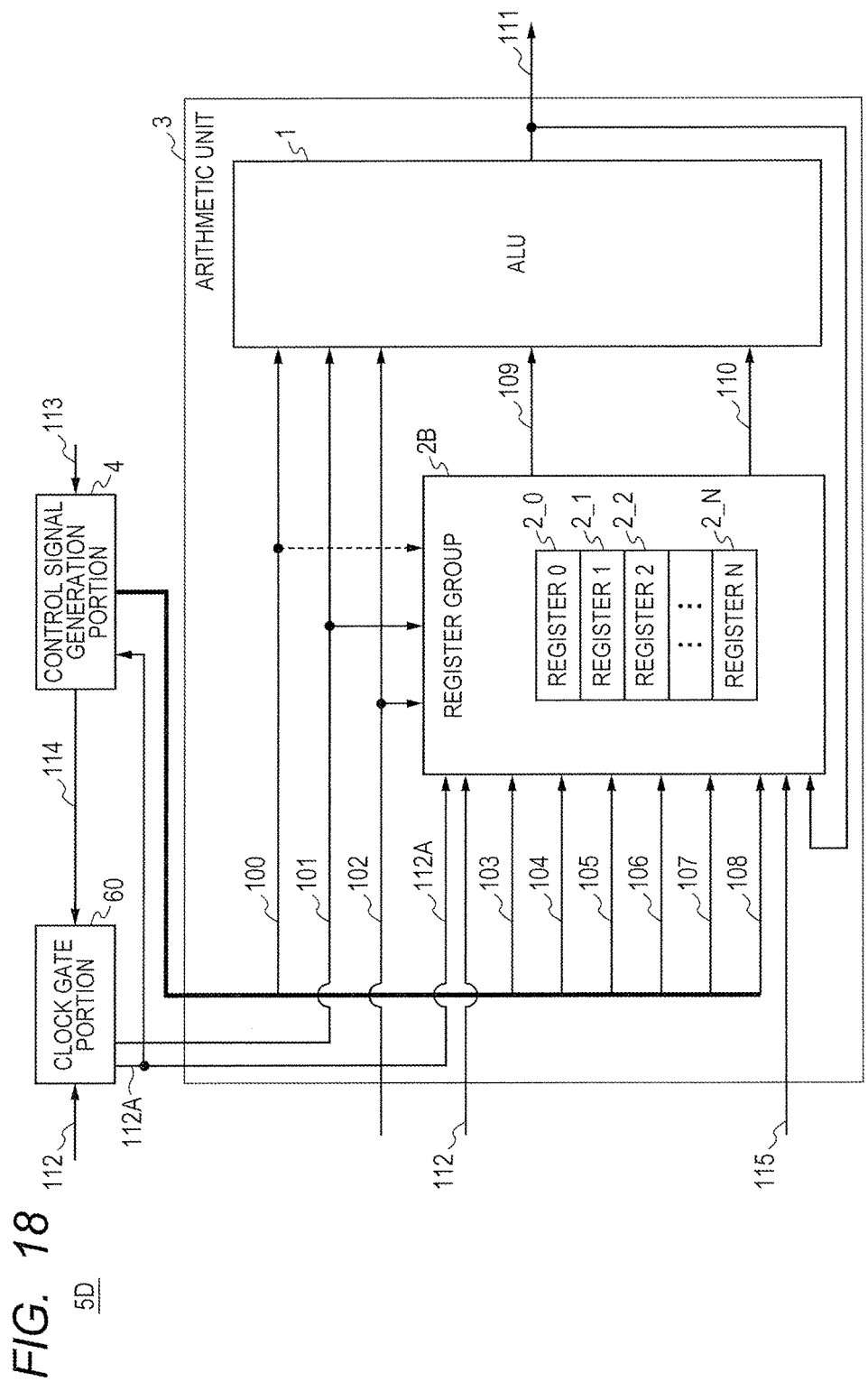
FIG. 18 is a block diagram schematically illustrating a configuration of a major part of a CPU according to a fifth embodiment.
Figure 19:
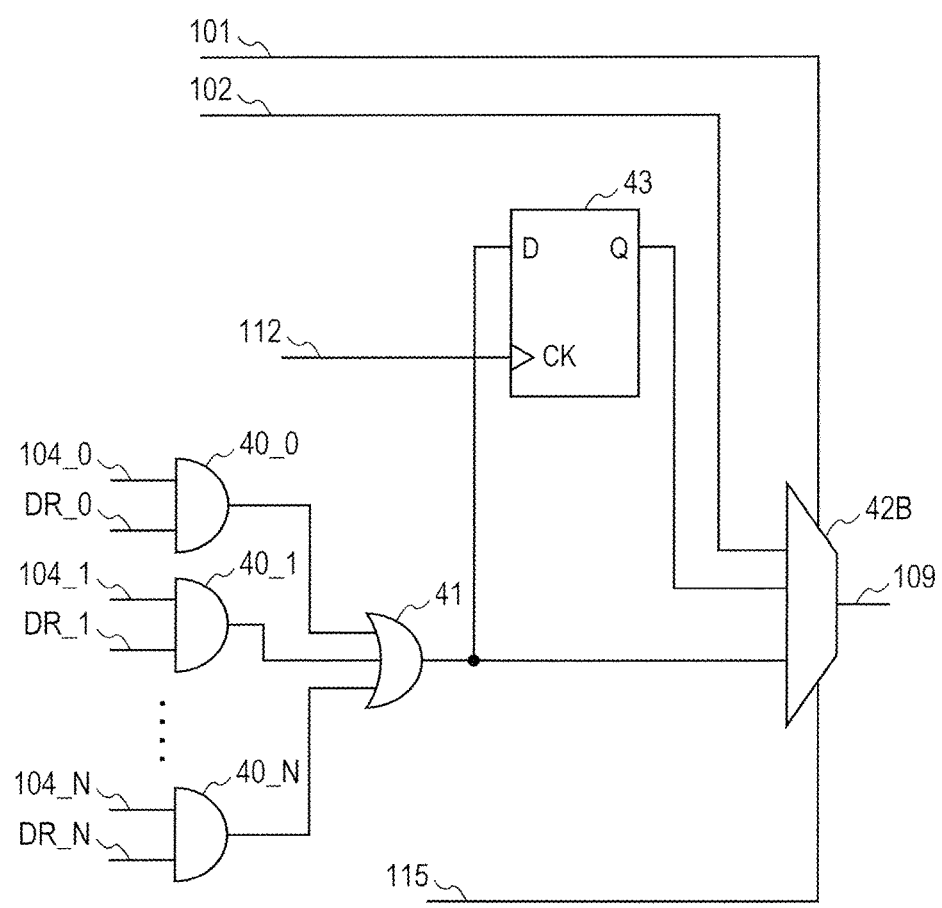
FIG. 19 illustrates a circuit configuration example of part of a register group in FIG. 18 that outputs a data signal to an ALU.

FIG. 18 is a block diagram schematically illustrating a configuration of a major part of a CPU according to the fifth embodiment. FIG. 19 illustrates a circuit configuration example of part of a register group in FIG. 18 that outputs a data signal to an ALU. FIG. 19 provides the circuit configuration that outputs data signal 1 (109). The same circuit configuration is used to output data signal 2 (110).

The CPU 5D illustrated in FIG. 18 differs from the CPU 5C in FIG. 14 in that a changeover suppression signal 115 is moreover input to a register group 2B. As illustrated in FIG. 19, part of the register group 2B to output data signal 1 (109) to the ALU is modified so that a selector 42B is directly supplied with an output from the OR gate 41 as a third input signal without passing through the source register 43. The selector 42B is moreover supplied with the changeover suppression signal 115 as a signal to specify the operation mode. For example, the changeover suppression signal 115 is available as a 1-bit signal that changes to the H level or the L level according to a value of a special register included in the CPU 5D.

The selector 42B operates similarly to the selector 42 according to the fourth embodiment if the changeover suppression signal 115 is inactive (e.g., L level) in the secure mode. The selector 42B outputs the changeover data signal 102 as output data 1 (109) to the ALU if the changeover control signal 101 is active. The selector 42B outputs data held in the source register 43 as output data 1 (109) to the ALU if the changeover control signal 101 is inactive. The selector 42B outputs an output from the OR gate 41 as data 1 to the ALU if the changeover suppression signal 115 is active (e.g., H level) in the non-secure mode.

Modification

The source register 43 and the selector 42B illustrated in FIG. 19 can be also provided for the register group according to the third embodiment. To combine the third and fifth embodiments, a signal from the OR gate 41 needs to be input as data signal 1 (109) to the ALU if the changeover suppression signal 115 is inactive (non-secure mode) and if an instruction other than the specific type of instructions to insert the inactive phase is fetched. Specifically, the selector 42B is not supplied with the changeover suppression signal 115 in FIG. 19. Instead, the selector 42B is supplied with a logical sum of the changeover suppression signal 115 and a decode result (or a signal representing the reversed decode result) from the simple decode circuit provided for the clock gate portion 60A as described with reference to FIG. 12.

All the disclosed embodiments just provide examples and must be considered to be nonrestrictive. The scope of the invention is defined by the appended claims, not the above description, and is intended to include meanings equivalent to the claims and all modifications within the claims.

What is claimed is:

1. A central processing unit comprising:
an arithmetic unit that includes a register group containing a plurality of registers and an arithmetic logic unit to perform arithmetic operation using data stored in a register selected from the plurality of registers; and
a control unit that controls the arithmetic unit,
wherein the arithmetic unit is configured to perform arithmetic processing using only data other than data stored in the plurality of registers, based on a signal from the control unit, during a first one-clock cycle in an execution cycle for the arithmetic unit to perform arithmetic processing corresponding to an incorporated instruction, and to perform arithmetic processing using data stored in the plurality of registers during subsequent cycles in the execution cycle,
wherein the register group further includes:
an output register to temporarily hold data for arithmetic operation stored in the selected register before the data is output to the arithmetic logic unit; and
a selection circuit that receives data held in the output register and the data other than data stored in the plurality of registers and outputs one of the data to the arithmetic logic unit according to control of the control unit, and
wherein the control unit allows the selection circuit to output the data other than data stored in the plurality of registers during a first one-clock cycle and subsequently allows the selection circuit to output data held in the output register while allowing the arithmetic unit to perform arithmetic processing corresponding to an incorporated instruction.

2. The central processing unit according to claim 1, further comprising:
a clock gate circuit to generate a gated clock signal that goes inactive during a period corresponding to one clock cycle subsequent to the first one-clock cycle,
wherein the plurality of registers and the control unit operate based on the gated clock signal.

3. The central processing unit according to claim 1,
wherein the control unit allows the arithmetic unit to perform arithmetic processing using the data other than data stored in the plurality of registers only when a specific type of at least one instruction is incorporated from external memory.

4. The central processing unit according to claim 3,
wherein the register group further includes:
an output register to temporarily hold data for arithmetic operation stored in the selected register before the data is output to the arithmetic logic unit; and
a selection circuit that receives data held in the output register, the data other than data stored in the plurality of registers, and the data for arithmetic operation before being held in the output register, and outputs one of the data to the arithmetic logic unit according to control of the control unit,
wherein, when the specific type of at least one instruction is incorporated, the control unit allows the selection circuit to output the data other than data stored in the plurality of registers during a first one-clock cycle and subsequently allows the selection circuit to output data held in the output register while allowing the arithmetic unit to perform arithmetic processing corresponding to an incorporated instruction, and
wherein, when a type of instruction different from the specific type of at least one instruction is incorporated, the control unit allows the selection circuit to output the data for arithmetic operation before being held in the output register while allowing the arithmetic unit to perform arithmetic processing corresponding to an incorporated instruction.

5. The central processing unit according to claim 3, further comprising:
a secure mode and a non-secure mode as operation modes, wherein the register group further includes:
an output register to temporarily hold data for arithmetic operation stored in the selected register before the data is output to the arithmetic logic unit; and
a selection circuit that receives data held in the output register, the data other than data stored in the plurality of registers, and the data for arithmetic operation before being held in the output register, and outputs one of the data to the arithmetic logic unit according to control of the control unit,
wherein, when the secure mode is enabled and the specific type of at least one instruction is incorporated, the control unit allows the selection circuit to output the data other than data stored in the plurality of registers during a first one-clock cycle and subsequently allows the selection circuit to output data held in the output register while allowing the arithmetic unit to perform arithmetic processing corresponding to an incorporated instruction, and
wherein, when a type of instruction different from the specific type of at least one instruction is incorporated or when the non-secure mode is enabled, the control unit allows the selection circuit to output the data for arithmetic operation before being held in the output register while allowing the arithmetic unit to perform arithmetic processing corresponding to an incorporated instruction.

6. The central processing unit according to claim 1, further comprising:
a secure mode and a non-secure mode as operation modes, wherein the register group further includes:
an output register to temporarily hold data for arithmetic operation stored in the selected register before the data is output to the arithmetic logic unit; and
a selection circuit that receives data held in the output register, the data other than data stored in the plurality of registers, and the data for arithmetic operation before being held in the output register, and outputs one of the data to the arithmetic logic unit according to control of the control unit,
wherein, in the secure mode, the control unit allows the selection circuit to output the data other than data stored in the plurality of registers during a first one-clock cycle and subsequently allows the selection circuit to output data held in the output register while allowing the arithmetic unit to perform arithmetic processing corresponding to an incorporated instruction, and
wherein, in the non-secure mode, the control unit allows the selection circuit to output the data for arithmetic operation before being held in the output register while allowing the arithmetic unit to perform arithmetic processing corresponding to an incorporated instruction.

7. The central processing unit according to claim 1,
wherein the arithmetic unit includes:
a plurality of circuit elements each of which includes one of a logical operation function and a storage function; and
a plurality of selection circuits each of which corresponds to at least part of the circuit elements and is provided for a path for an output signal from a corresponding circuit element, and
wherein each of the selection circuits receives an output signal from a corresponding circuit element and a signal for the data other than data stored in the plurality of registers and outputs one of signals under control of the control unit.

8. An arithmetic unit comprising:
a register group including a plurality of registers; and
an arithmetic logic unit that performs arithmetic operation using data for arithmetic operation stored in a register selected from the plurality of registers; and
a control unit configured to control the register group and the arithmetic logic unit,
wherein the register group includes:
an output register to temporarily hold the data for arithmetic operation before the data is output to the arithmetic logic unit; and
a selection circuit that receives data held in the output register and data other than data stored in the plurality of registers for arithmetic operation and outputs one of data to the arithmetic logic unit, and
wherein in an execution cycle for the arithmetic logic unit to perform arithmetic processing corresponding to an incorporated instruction, the control unit controls the selection circuit to output only data other than data stored in the plurality of registers during a first one-clock cycle and then subsequently controls the selection circuit to output data held in the output register.

9. An arithmetic unit having a secure mode and a non-secure mode, comprising:
a register group including a plurality of registers; and
an arithmetic logic unit that performs arithmetic operation using data for arithmetic operation stored in a register selected from the plurality of registers; and
a control unit configured to control the register group and the arithmetic logic unit,
wherein the register group includes:
an output register to temporarily hold the data for arithmetic operation before the data is output to the arithmetic logic unit; and
a selection circuit that receives data held in the output register, data other than data stored in the plurality of registers to the data for arithmetic operation, and the data for arithmetic operation before being held in the output register, and outputs one of the data to the arithmetic logic unit,
wherein in a cycle for the arithmetic logic unit to perform arithmetic processing in the secure mode, the control unit controls the selection circuit to output only the data other than data stored in the plurality of registers during a first one-clock cycle and subsequently controls the selection circuit to output data held in the output register, and
wherein in a cycle for the arithmetic logic unit to perform arithmetic processing in the non-secure mode, the controller controls the selection circuit to output the data for arithmetic operation before being held in the output register.

10. A central processing unit comprising:
an arithmetic unit that includes a register group containing a plurality of registers and an arithmetic logic unit to perform arithmetic operation using data stored in a register selected from the plurality of registers; and
a control unit that controls the arithmetic unit,
wherein the arithmetic unit is configured to perform arithmetic processing using only changeover data other than data stored in the plurality of registers, based on a signal from the control unit, during a first one-clock cycle in an execution cycle for the arithmetic unit to perform arithmetic processing corresponding to an incorporated instruction, wherein the changeover data are not processed from the data stored in the plurality of registers, and to perform arithmetic processing using data stored in a register selected from the plurality of registers during subsequent cycles in the execution cycle,
wherein the register group further includes:
an output register to temporarily hold data for arithmetic operation stored in the selected register before the data is output to the arithmetic logic unit; and
a selection circuit that receives data held in the output register and the data other than data stored in the plurality of registers and outputs one of the data to the arithmetic logic unit according to control of the control unit, and
wherein the control unit allows the selection circuit to output the data other than data stored in the plurality of registers during a first one-clock cycle and subsequently allows the selection circuit to output data held in the output register while allowing the arithmetic unit to perform arithmetic processing corresponding to an incorporated instruction.

11. A central processing unit comprising:
an arithmetic unit that includes a register group containing a plurality of registers and an arithmetic logic unit to perform arithmetic operation using data stored in a register selected from the plurality of registers; and
a control unit that controls the arithmetic unit,
wherein the arithmetic unit is configured to perform arithmetic processing using only data other than data stored in the plurality of registers, based on a signal from the control unit, during a first one-clock cycle before any cycle for the arithmetic unit to perform arithmetic processing using data stored in a register selected from the plurality of registers corresponding to an incorporated instruction,
wherein the register group further includes:
an output register to temporarily hold data for arithmetic operation stored in the selected register before the data is output to the arithmetic logic unit; and
a selection circuit that receives data held in the output register and the data other than data stored in the plurality of registers and outputs one of the data to the arithmetic logic unit according to control of the control unit, and
wherein the control unit allows the selection circuit to output the data other than data stored in the plurality of registers during a first one-clock cycle and subsequently allows the selection circuit to output data held in the output register while allowing the arithmetic unit to perform arithmetic processing corresponding to an incorporated instruction.

\* \* \* \* \*